(No Model.) 2 Sheets—Sheet 1.
H. WHITE.
PHOTOGRAPHIC SHUTTER OPERATING LEVER.
No. 599,576. Patented Feb. 22, 1898.

WITNESSES:

INVENTOR:
Harriet White
By her Attorneys,
Wm C. Strawbridge
J Bonsall Taylor (No Model.) 2 Sheets—Sheet 2.
H. WHITE.
PHOTOGRAPHIC SHUTTER OPERATING LEVER.

No. 599,576. Patented Feb. 22, 1898.

WITNESSES: Harriet White INVENTOR:

UNITED STATES PATENT OFFICE.

HARRIET WHITE, OF FLUSHING, NEW YORK.

PHOTOGRAPHIC-SHUTTER-OPERATING LEVER.

SPECIFICATION forming part of Letters Patent No. 599,576, dated February 22, 1898.

Application filed October 5, 1897. Serial No. 654,117. (No model.)

*To all whom it may concern:*

Be it known that I, HARRIET WHITE, a citizen of the United States, residing at Flushing, in the county of Queens and State of New York, have invented certain new and useful Improvements in Photographic-Shutter-Operating Levers, of which the following is a specification.

In the operation of cameras, in the taking of time exposures, as is well known, it is a matter of first importance to regulate and control to a nicety the precise length of the period of exposure, to the end that the exposure may continue for a period neither longer nor shorter than the predetermined number of seconds fixed upon as requisite to produce the best result.

In practical operations, however, it is almost impossible to make an exposure for exactly the selected number of seconds, by reason of the fact that the operator must, in making such exposure, glance at his watch or other time piece, then find and manipulate the shutter operating contrivance, then look again at this time piece to observe the running of the seconds, and, when the necessary or predetermined number of seconds have elapsed, again turn to and manipulate the shutter operating device.

As a result of the necessity for glancing from the camera to the time piece, and from the time piece to the camera, in the making of an exposure, a certain amount of time is lost, and, therefore the determination of the period of exposure is less accurate than is desirable.

This difficulty is enhanced where exposures are made out of doors or by tourists, when it becomes necessary for the operator to hold in his hand and consult such a time piece as a watch.

It is the object of my invention to provide a camera with means by which this personal equation may be eliminated and the length of time of the exposure regulated and controlled with great accuracy.

Generally stated, my invention comprehends the provision of a camera in or upon which is mounted a time piece such as an ordinary form of stop watch, the stem of which is maintained in position to be encountered by a moving device, such as a lever, which is also directly or indirectly connected with the shutter or shutter-operating mechanism, the result of this arrangement being that, the stop-watch being set at zero, and all the preliminary arrangements for the making of an exposure completed, the throw of said shutter to open position, by the operator, occasions the synchronous depression of the stem of the stop-watch to set the latter in operation.

The operator then, with his eyes upon the stop-watch, may as soon as its hand indicates the passage of the desired number of seconds, instantly close the shutter.

The lever and stop-watch being preferably located on the same side of the casing of the camera, the operator may, in reading the watch, retain his finger upon the lever or shutter operating device, so that he may throw the same to close the shutter instantly upon the hand of the watch reaching the predetermined figure, and without removing his eyes from the watch.

Such being the general object and nature of my invention, it is manifest that many forms of embodiment may be resorted to to carry it into effect; that form which I have illustrated in the drawings, and herein described, however, is one which is simple and compact, and for many reasons preferable, but is by no means the only form in which my invention may be embodied.

In the accompanying drawings.

Similar letters of reference indicate corresponding parts.

In setting out the details of my invention, I deem it unnecessary to illustrate or describe the ordinary working parts of the camera in connection with which I have illustrated my devices as employed, as such description would be redundant, said parts being well known to those familiar with the art.

In the accompanying drawings,

A indicates a camera casing of any ordinary and convenient type and form, provided with the usual appliances and appurtenances such as a finder $a$, a focus adjusting device $a'$ and a roll take-up device $a^2$.

B is a shutter of a well-known general type, being a substantially circular disk of metal mounted for rotation, over the camera lens-opening $a^\times$, upon an axial pin or screw $b$,—and embodying a shutter opening $b^\times$, and also provided with a marginal recess $b'$, the respective ends $b^2$ $b^3$ of which by alternate contact with a fixed stop $b^4$, limit the rotative movement or oscillation of said shutter so as to cause it to stop, when moving to the left, with its opening $b^\times$ in registry with the lens-opening $a^\times$ in the front plate of the camera, and when moving to the right to stop in a position in which its opening $b^\times$ will be out of registry with said lens-opening $a^\times$.

$b^5$ $b^6$ are catches projecting upwardly from the edge of the shutter.

D is a shutter operating lever, mounted for rotative oscillation upon a screw stud $d$ secured to the front plate of the camera in the vicinity of the shutter, the outer end of said lever projecting through a suitable opening $d^\times$ in the side wall of the camera casing, and the inner end of said lever being provided with an inclined hook $d^\times$.

$D^\times$ is a spring wire rod, the inner end of which is rigidly secured to the lever D, and the outer or free extremity of which extends through an opening formed in an upwardly projecting lug $B^\times$ mounted on the shutter B.

The oscillation or movement of the lever D in one direction occasions the opening of the shutter, and its oscillation or movement in the opposite direction occasions the closing of the shutter, in a manner well known to those familiar with shutters and shutter-operating mechanisms of the character illustrated.

Figure 1:
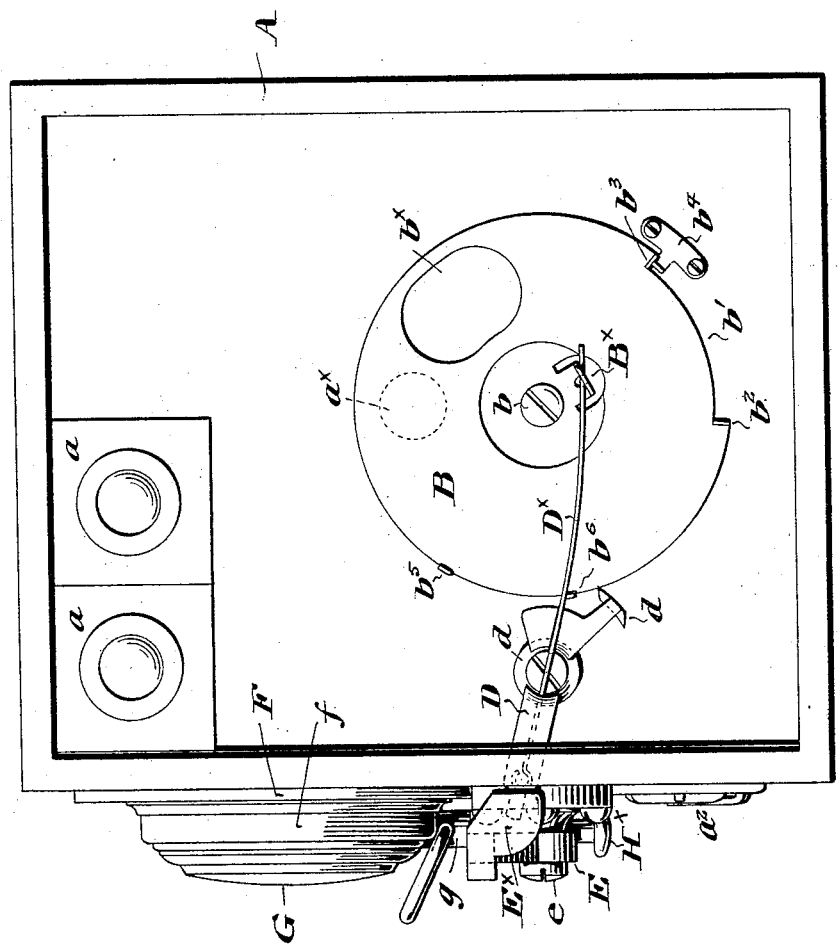
Figure 1 is a view in front elevation of a camera equipped with my improvements.

When the shutter is in the position shown in Figure 1, and it is desired to throw it open, the outer end of the lever D is depressed, and, the inner end of said lever being thereby caused to move upward, the hook $d'$ temporarily engages the lowermost catch $b^6$ and, while, in the continued movement of the lever, sliding past said catch $b^6$, operates in the meantime to maintain the shutter in fixed position.

So soon, however, as in the continued movement of the lever, said hook clears the catch $b^6$, said shutter becomes free to move, and the wire spring rod, having in the meantime become considerably flexed so that it exerts considerable lateral pressure against the lug $B^\times$ and consequently against the shutter itself, immediately forces said shutter to open position with a very quick motion, the shutter, under the actuation of the spring rod, continuing to move until the end $b^2$ of the recess $b'$ encounters the stop $b^4$, in which position the opening $b^\times$ will register with the opening $a^\times$.

The shutter being open, the reverse movement of the lever D will occasion its closing or return to the position shown in Figure 1, the parts operating in a manner the reverse of that just described, that is to say, in such reverse movement of the lever D, the hook $d^\times$ engages with the catch $b^5$ and moves past said catch, the spring rod, as soon as said hook has cleared said catch, operating to quickly throw the shutter to the closed position shown in Figure 1, in which the upper end $b^3$ of the recess $b'$ is in contact with the stop or keeper $b^4$.

It will be understood that any kind of shutter and any type of shutter operating device may be employed, the shutter and shutter-operating devices just described being selected arbitrarily from many well-known forms of said apparatus.

Figure 2:
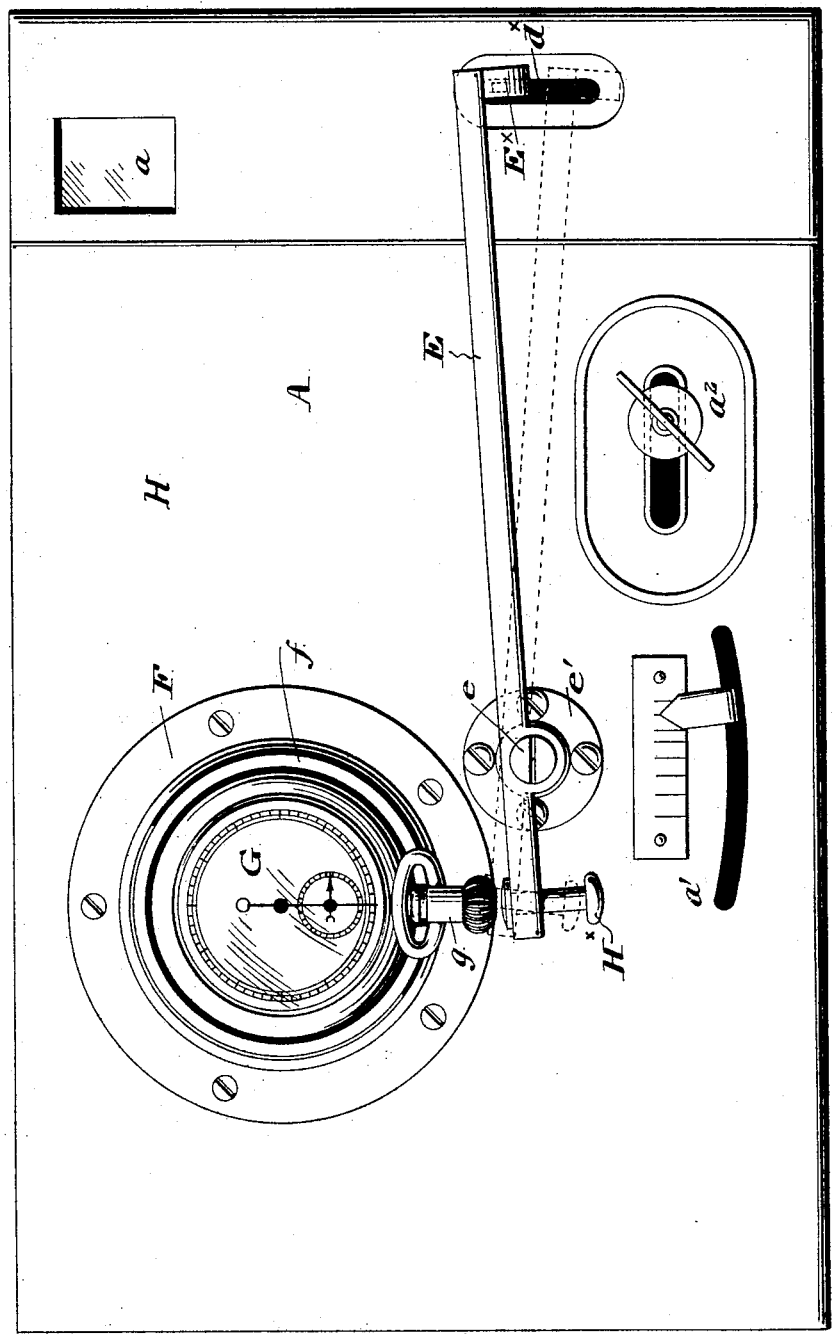
Figure 2 is a view in side elevation of the same, sight being taken toward the left-hand side of the apparatus, as the same is shown in Figure 1.

E, Figure 2, is a lever, which I term the watch tripping lever, conveniently mounted upon the exterior of the camera casing, and adapted to have pivotal or oscillatory movement, said lever being to such end mounted upon a screw stud $e$ entered in a plate $e'$ secured to the side wall of the camera.

The front end of the lever E makes connection with the lever D, being to such end provided with an inwardly turned head $E^\times$ having a recess which receives the protruding extremity of the shutter operating lever D.

F is an annular pocket adapted to receive a stop watch of any usual character, and secured in any convenient manner to the side wall of the camera, the protruding rim or wall $f$ of said pocket having in its lower portion a recess through which the stem $g$ of a stop watch G mounted in said pocket projects, the watch pocket F and lever E being so disposed with relation to each other that when the watch is mounted in the pocket the head of the watch stem is located just above the rear end of the watch tripping lever E.

A portion of the side of the camera casing upon which the watch tripping lever and watch pocket are mounted, is formed as a plate H, independent of and detachable from the body of said camera casing, said plate H being ordinarily secured in the position shown in the drawings by any usual latching or locking contrivance.

This arrangement of a removable side plate, which is intended to afford convenient access to the contained working parts of the camera,—is usual in cameras.

It will be understood that, by virtue of the special construction of the front end of the watch tripping lever illustrated and described, the connection between said watch tripping lever and the shutter-operating lever, does not interfere with the removal of said plate H, and its return to position,—inasmuch as in the removal of said plate, the socket-provided head of said watch tripping lever is, in the movement of the plate, simply lifted off of the end of the shutter-operating lever, and, in the return of said plate to position, the recess in said head or end of the watch tripping lever is carried into position over the projecting end of said shutter-operating lever,—in other words, the watch tripping lever is automatically disengaged from and engaged with the shutter operating lever in the removal and return of the plate H.

The operation of the apparatus will be readily understood:—

The parts being supposed in the position shown in the drawings and the camera being set for the taking of a picture, the operator, by depressing the front end of the watch tripping lever E, will, through the shutter operating lever D, throw the shutter B open, and, synchronously, by the same operation cause the rear end of the watch tripping lever E, which of course rises when the front end of the lever is depressed, to bear against the head of the stem of the watch and thereby start said watch.

The watch being thus started synchronously with the beginning of the exposure, the operator may, by observing the face of the watch, while his hand remains upon the watch tripping lever E, force upward said lever for the closing of the shutter at the instant that the stop-watch indicates the passage of the selected number of seconds.

Manifestly, the timing of the exposure can be regulated with great exactness.

As is well known, stop watches of the ordinary type are so constructed that the first pressure on the head causes them to start, the next succeeding pressure or impulse causes them to stop, and the third pressure or impulse causes the hand to return to zero.

In order that, after the exposure has been made and the shutter closed, the hand of the watch may be stopped and caused to return to zero without the necessity for removing the watch from its pocket, I provide a double headed button $H^\times$, mounted free for vertical movement in a vertical passage extending through the rear end of the watch tripping lever E in alinement with the stem of the watch.

Pressure upward against the lower end of this button is transmitted to the head of the watch stem, with the result that, after the exposure has been made, two impulses imparted to the head of the stem through this button, will cause the watch hand first to stop and then to return to zero.

Having thus described my invention, I claim—

1. In combination, in a camera, a shutter, a shutter operating lever, a watch pocket mounted on said camera, a stop watch mounted in said watch pocket, a watch tripping lever pivotally mounted on the camera casing, engaged as to one end to the shutter operating lever, and adapted as to its other end to encounter the head of the stem of the stop watch, substantially as set forth.

2. In a camera, in combination, a shutter, and a shutter operating lever mounted on the front of said camera, said lever having a laterally projecting end, a watch tripping lever pivotally mounted upon the side of the camera casing, a watch casing or pocket mounted upon the side of the camera casing, a stop watch mounted in said pocket and having its stem protruding beyond the same, in position to be encountered by the rear end of the watch tripping lever, and means for connecting the front end of the watch tripping lever and the protruding end of the shutter operating lever, substantially as set forth.

3. In combination, a camera, a shutter, a shutter operating lever, a watch pocket, a watch, a watch tripping lever and a button mounted in the end of said watch tripping lever, substantially as set forth.

4. In a camera, in combination, a casing having a removable plate, a watch tripping lever mounted on said plate, a watch pocket mounted on said camera casing, and adapted to be thrown into operation by said watch tripping lever, and a shutter operating lever, said watch tripping lever being provided with a recess adapted to receive the projecting end of said shutter operating lever, substantially as set forth.

5. A camera casing having a removable side plate, a shutter, a shutter operating lever, a watch tripping lever mounted on said removable plate, and provided with a recess adapted to receive the end of the shutter operating lever, a stop-watch pocket, and a stop-watch mounted in said pocket, and adapted to be encountered by said watch-tripping lever, substantially as set forth.

In testimony that I claim the foregoing as my invention I have hereunto signed my name this 27th day of September, A. D. 1897.

HARRIET WHITE.

In presence of—
JOSEPH BURKE,
GEORGE LEWIS.